INVENTOR.
ROBERT S. MORROW
By
Murray & Jenkhauer
Attorneys

INVENTOR.
ROBERT S. MORROW
By Murray & Linkhauer
Attorneys 3,521,159

ELECTRICAL SENSING APPARATUS INCORPORATING TEMPERATURE COMPENSATION

Robert S. Morrow, Columbus, Ohio, assignor to IRD Mechanalysis, Inc., Worthington, Ohio, a corporation of Ohio Filed Jan. 11, 1968, Ser. No. 697,110
Int. Cl. G01r *33/12;* H03b *3/02*
U.S. Cl. 324—34 8 Claims

ABSTRACT OF THE DISCLOSURE

Electrical sensing apparatus such as proximity detectors and vibration pickups of the type in which the instantaneous displacement between an inductor in the tank circuit of an oscillator and a metallic object in the field of the inductance is reflected in the output of the oscillator. The apparatus incorporates: means adapted to compensate for changes in the output amplitude of the oscillator due to temperature variations in the aforesaid inductor. Temperature compensation is accomplished by applying an auxiliary potential across the inductor and sensing variations in this potential with temperature variations to vary the gain of an electron valve in the oscillator and/or related output circuitry.

CROSS-REFERENCES TO RELATED APPLICATIONS

Application Ser. Nos. 697,108 and 697,109 filed concurrently herewith and assigned to the assignee of this invention.

BACKGROUND OF THE INVENTION

In the past, electrical sensing devices have been provided comprising an electrical oscillator having a tank circuit including an inductive element, characterized in that the amplitude of the oscillations produced by the oscillator is a function of the displacement between the tank circuit inductive element and a metallic object in the field of the inductive element, such devices operate on the eddy current principle, the output of the oscillator being a function of the radiated energy absorbed by the metallic object in the field of the inductance. As will be understood, this absorbed energy is, in turn, a function of the distance between the inductance and the metallic object. Consequently, such devices can be used as proximity detectors or as pickups for vibration analyzing apparatus.

In the case of a proximity detector, a change in the output of the oscillator occurs when a metallic object comes within the field of the tank circuit inductance, which usually is incorporated in a compact sensing head or probe. The output change normally activates a suitable relay.

The use of such a device as a vibration pickup operates on somewhat the same principle, except that the output of the oscillator is utilized to produce a sinusoidal wave shape signal resulting from the oscillatory vibrational movement of a metallic member relative to a stationary inductive pickup. Consider, for instance, any rotating shaft housed within a bearing. Due to unbalance or eccentricity, the shaft will oscillate in a plane normal to its axis of rotation. Consequently, by mounting an inductive proximity pickup in a bearing for the shaft such that the periphery of the shaft is in the inductive field for the pickup, the output of the oscillator to which the pickup is connected can be rectified and used to generate a sinusoidal vibrational signal for vibration analyzing purposes.

SUMMARY OF THE INVENTION

Sensing devices of the type described above are temperature sensitive due to changes in the resistivity of the inductive pickup as the surrounding temperature varies. This is a serious drawback in cases where the operating temperature may vary over a relatively wide range.

Accordingly, the objects of the invention include:

To provide temperature compensating means in an inductive electrical sensing device of the type described whereby the output of the oscillator to which an inductive pickup is connected is essentially unaffected over wide temperature ranges without requiring any manual adjustment of the oscillator or its associated circuitry; and To provide temperature compensating means of the type described wherein a potential is produced across an inductive pickup and variations in this potential due to temperature variations are sensed and utilized to vary the gain of an electron valve in the oscillator or its associated output circuitry.

In accordance with the invention, means are provided, in an electrical sensing device employing an inductive pickup in the tank circuit of an oscillator, for applying a potential across the inductive pickup separate and apart from that due to oscillations produced by the oscillator itself whereby the magnitude of the potential will be a function of the temperature of the inductive element itself, together with means responsive to the potential across the inductive element for varying the amplitude of the output oscillations of the oscillator as a function of the magnitude of said potential.

Preferably, the potential applied across the inductive pickup is a direct current potential or an alternating current potential having a much lower frequency than the radio frequency oscillations produced by the oscillator. Variations in this potential across the pickup are amplified in an amplifier and thereafter applied to the base of an electron valve, usually a transistor, in the oscillator circuitry. As the temperature of the pickup increases, its resistivity and, hence, the potential thereacross will increase proportionately. The natural effect of this is to decrease the amplitude of the oscillations produced by the oscillator. However, by amplifying the increased potential across the pickup and by applying this increased potential to the base of the oscillator transistor in inverse proportion to decrease the bias thereon, the gain of the transistor is increased to compensate for the temperature rise. In a similar manner, when the temperature drops, the potential across the pickup decreases, the amplitude of the oscillations tend to increase, and the gain of the oscillator transistor is decreased to compensate for the decrease in the temperature.

DESCRIPTION OF THE PREFERRED EMBODIMENT(S)

Figures 1, 2, 3:
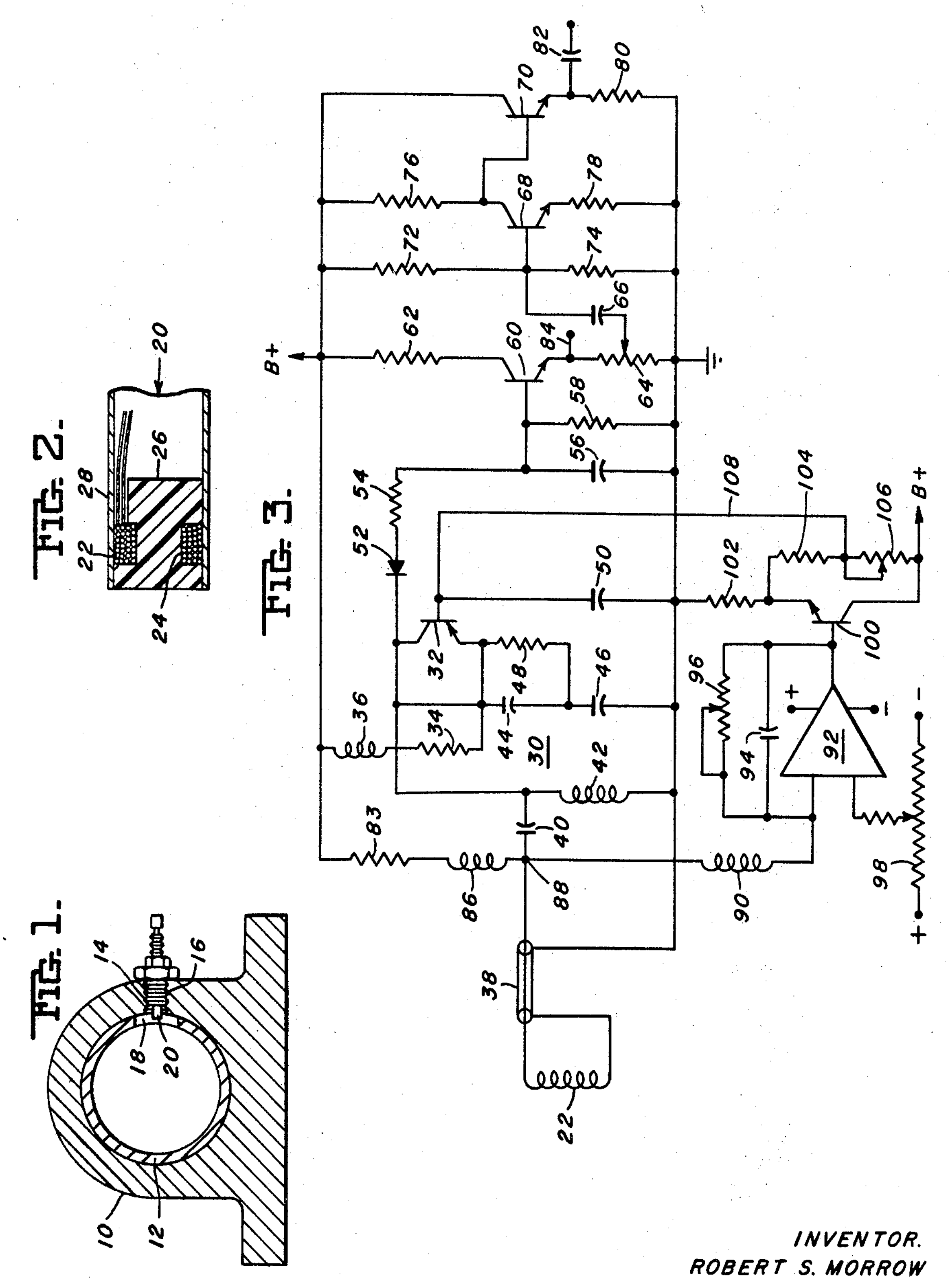
FIG. 1 is a cross-sectional view showing the manner in which the inductive probe or pickup of the invention is mounted in relation to one type of rotating body.
FIG. 2 is an extended cross-sectional view of the forward end of the probe shown in FIG. 1.
FIG. 3 is a schematic circuit illustration of one embodiment of the invention employing a direct current temperature sensing voltage.

With reference now to the drawings, and particularly to FIG. 1, a bearing housing 10 is shown provided with an interior bronze bushing bearing 12 or the like. The side wall of the housing 10 is provided with a threaded opening 14 which receives a threaded hollow shank 16. Extending through the hollow shank 16 and into a cut-out portion 18 of the bearing 12 is an inductive pickup head, generally indicated by the reference numeral 20.

The details of the forward end of the inductive pickup 20 are illustrated in FIG. 2. It comprises a coil 22 of copper wire or the like wound within a slot 24 provided in a bobbin 26 of insulating material such as nylon. The bobbin 26, in turn, is disposed at the forward end of an aluminum tube 28 which is threaded into the hollow shank 16 shown in FIG. 1.

Assuming that the coil 22 is included in the tank circuit of an oscillator, the inductive field produced by the coil 22 will intersect the periphery of a shaft, not shown, disposed within the bearing 12. The radiated energy from the magnetic field is absorbed by the aforesaid shaft through ohmic and hysteresis losses; and the magnitude of this loss is a function of the distance between the coil and the periphery of the shaft. Consequently, if the shaft is vibrating due to eccentricity or other reasons, its periphery, upon rotation, will move toward and away from the pickup 20 in a cyclic, sinusoidal fashion, whereby the amount of energy absorbed by the rotating shaft will also vary in a sinusoidal manner. Assuming, again, that the coil 22 is included in the tank circuit of an oscillator, this sinusoidal variation in energy absorption will produce a corresponding sinusoidal variation in the amplitude of the output oscillations from the oscillator. These oscillations may be rectified to provide a sinusoidal vibration signal having a frequency corresponding to the frequency of the vibrations and an amplitude which varies as a function of the magnitude or peak-to-peak displacement of the vibration.

Circuitry for producing a sinusoidal vibration signal with the inductive pickup of FIGS. 1 and 2 and incorporating the temperature compensating feature of the invention is shown in FIG. 3. The circuitry includes a Colpitts-type oscillator, generally indicated by the reference numeral 30. The oscillator 30 is provided with a PNP transistor 32 having its emitter connected through resistor 34 and radio frequency choke 36 to a source of driving potential, identified as B+. The tank circuit of oscillator 30 includes the coil 22 having its one end connected to ground through the shield of a coaxial cable 38 and its other end connected through the center conductor of the coaxial cable 38 and capacitor 40 to the collector of transistor 32. The tank circuit for oscillator 30 further includes a second inductor 42 connected between the collector of transistor 32 and ground, and also includes series-connected capacitors 44 and 46 which are in shunt with inductor 42. The circuit also includes a resistor 48 in shunt with capacitor 44, and includes a capacitor 50 connected between the base of transistor 32 and ground. The inductor 42 and the coil or inductor 22 both form a part of the tank circuit for oscillator 30, the magnitude of inductor 42 being much larger than inductor 22. For example, the value of inductor 42 should be approximately 100 microhenries; whereas that of inductor 22 should be about 30 microhenries.

With the arrangement shown, the oscillator 30 will produce output oscillations on the collector of transistor 32 at a frequency of about 1 megacycle. These oscillations are rectified by rectifier 52 and applied through resistor 54 across a smoothing capacitor 56. The resulting rectified voltage is, in turn, applied across resistor 58 and, hence, appears at the base of a direct current amplifying transistor 60. The collector of transistor 60 is connected to the B+ voltage source through resistor 62; while its emitter is connected to ground through potentiometer 64. The movable tap on potentiometer 64 is connected through coupling capacitor 66 to the base of transistor 68. The collector of transistor 68 is, in turn, connected to the base of an emitter-follower output transistor 70. Biasing voltage is applied to the base of transistor 68 by means of a voltage divider comprising resistors 72 and 74 connected between the B+ voltage source and ground. The circuit also includes resistors 76 and 78 which connect the collector and emitter of transistor 68 to the B+ voltage source and ground, respectively. A resistor 80 connects the emitter of transistor 70 to ground. The output of the circuit can then be applied to succeeding circuitry via output coupling capacitor 82.

If it is assmed, for example, that a metallic object is located at a fixed distance from the pickup coil 22 and in the field of the coil, the oscillator 30 will produce output oscillations which are rectified by rectifier 52 and applied to the base of transistor 60. Under these circumstances, a direct current voltage, proportional in magnitude to the distance between the pickup coil and the object in its field, will appear at the emitter of transistor 60 and at output terminal 84. There are no alternating current components in the rectified direct current voltage and, accordingly, no signal is applied through capacitor 66 to the base of transistor 68.

Now, if it is assumed that an object, such as a shaft within the bearing 12 of FIG. 1, is vibrating back and forth with respect to the pickup coil 22, oscillations will still be produced at a frequency of about 1 megacycle by the oscillator 30. However, the oscillations will cyclically vary in amplitude as the periphery of the shaft moves toward and away from the pickup coil 22; and the frequency of this cyclic variation in amplitude will correspond to the vibrational frequency of the shaft within bearing 12. Under these circumstances, the output of the oscillator at the collector of transistor 32 will appear as waveform A in FIG. 4 wherein the 1 megacycle oscillations periodically vary in amplitude. Thus, between times $t_1$ and $t_2$ in waveform A of FIG. 4, the periphery of the shaft within bearing 12 is moving away from the pickup 22 such that less radiated energy is absorbed as eddy current and hysteresis losses. As a result, the amplitude of the output oscillations increases. Between times $t_2$ and $t_3$ of FIG. 4, however, the periphery of the shaft within bearing 12 is moving toward the pickup; whereupon the loss of radiated energy increases and the amplitude of the oscillations decreases.

Figures 4, 5, 6:
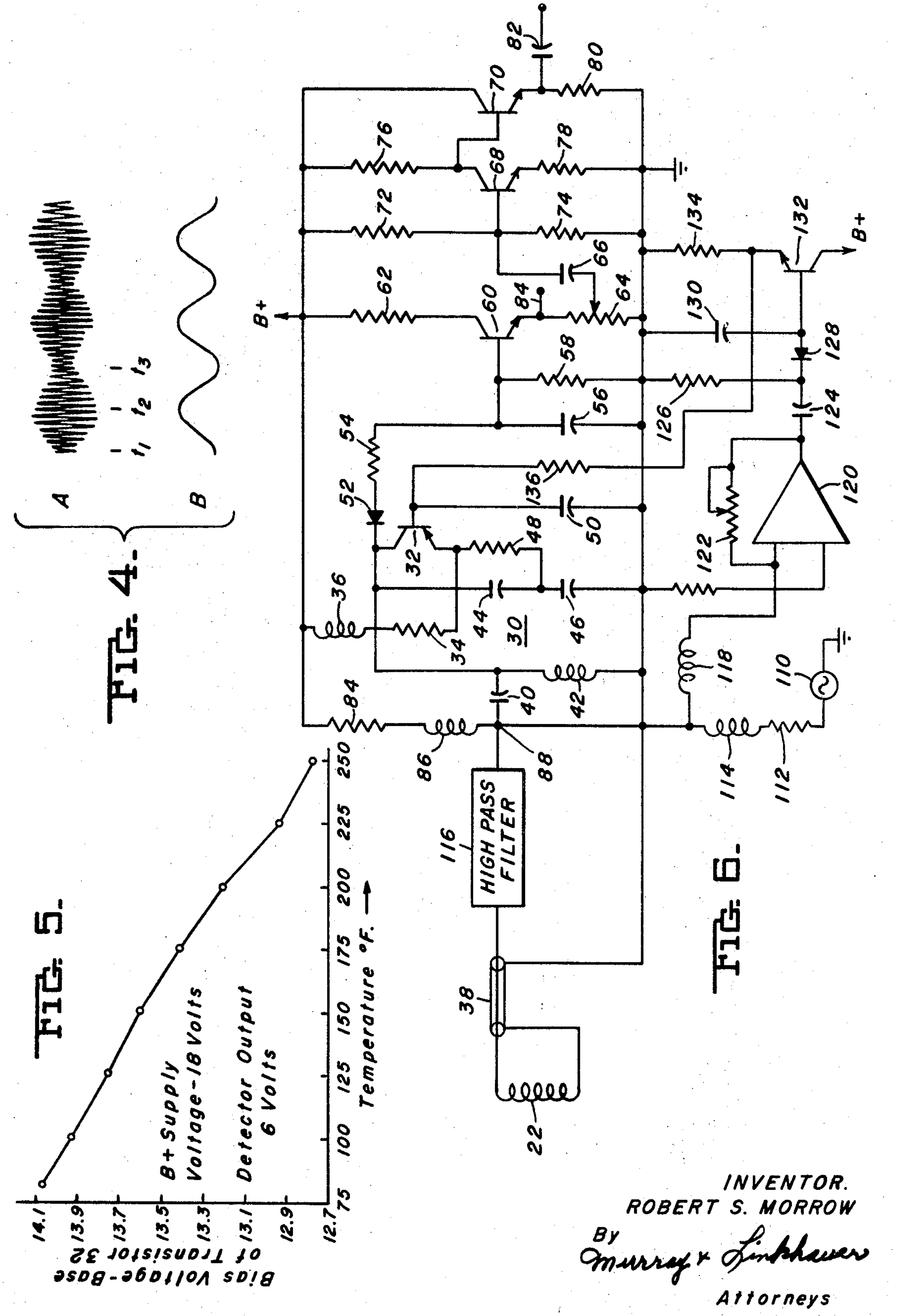
FIG. 4 comprises waveforms illustrating the operation of the circuit of FIG. 3.
FIG. 5 is a plot of oscillator transistor base bias voltage versus temperature for the circuit of FIG. 3.
FIG. 6 is a schematic circuit diagram of another embodiment of the invention employing an alternating current temperature sensing voltage across the inductive pickup.

The oscillations, after rectification in rectifier 52 and smoothing by capacitor 56, will appear as a sinusoidal varying direct current voltage illustrated as waveform B in FIG. 4. This voltage, when applied to the base of transistor 60, will still produce a direct current voltage on the output lead 84; however the alternating component of the direct current voltage will be coupled through capacitor 66 to the base of transistor 68. Hence, a sinusoidal wave shape, corresponding to waveform B of FIG. 4, will appear at the emitter of transistor 70; and this sinusoidal wave shape will comprise a vibrational signal the frequency of which corresponds to the frequency of the vibration and the amplitude of which corresponds to the displacement or magnitude of the vibration.

As was mentioned above, the amplitude of the output oscillations from oscillator 30 will vary as a function of the temperature of the pickup coil 22. That is, as the temperature of the coil 22 increases, its resistivity will likewise increase, thereby tending to decrease the amplitude of the output oscillations. In certain applications, including vibration analyzing techniques, this is a serious drawback in that the amplitude of the output appearing at the emitter of transistor 70 will not be a true indication of the displacement of the vibration. In normal service, the pickup must perform over a wide range of temperature.

The circuitry for compensating changes in temperature includes a resistor 83 and radio frequency choke 86 connected in series with the pickup 22 between the B+ voltage source and ground. Consequently, in addition to the 1 megacycle oscillations appearing across the inductor 22, a direct current potential is superimposed thereacross. Furthermore, the magnitude of this D.C. potential with respect to ground, appearing at point 88, will vary as the resistivity of the coil 22 changes due to variations in temperature. Assume, for example, that the temperature of the coil 22 rises and that its resistivity likewise rises. Under these circumstances, the direct current potential at point 88 will also increase. This potential is applied through a radio frequency choke 90 to one input terminal of a direct current operational amplifier, generally indicated by the reference numeral 92. The operational amplifier 92 is provided with a negative feedback path including a capacitor 94 and a rheostat 96 in parallel. The output voltage level of the operational amplifier 92 may be controlled by means of a potentiometer, generally indicated by the reference numeral 98.

The output of the operational amplifier 92 is applied to the base of a transistor 100 having its emitter connected through resistor 102 to ground and having its collector connected to a source of B+ positive potential. The voltage appearing across the emitter and collector of the transistor 100 is applied across a voltage divider consisting of resistor 104 and rheostat 106 in series; and the junction of resistor 104 and rheostat 106 is connected through lead 108 to the base of transistor 32. It will be remembered that when the temperature of the pickup coil 22 increases, the voltage at point 88 also increases. This voltage increases the output of the operational amplifier 92 and decreases the positive bias on the base of transistor 32 via lead 108. Consequently, the gain of the transistor 32 is increased to compensate for what would otherwise be a decrease in the amplitude of the oscillations due to increased resistivity of the pickup coil 22.

Similarly, as the temperature and resistivity of the coil 22 drop, the output oscillations from oscillator 30 will tend to increase, but this will be compenstaed for by an increase in the voltage appearing at point 88 and a consequent increase in the positive bias on the base of transistor 32.

In the calibration of the circuitry of FIG. 3, a metallic object is usually spaced from the end of the pickup coil 22 by about 20 mils. Thereafter, the potentiometer 98 and/or rheostat 106 associated with the operational amplifier 92 is adjusted until the output voltage at terminal 84 assumes six volts. Thereafter, a vibrating object of known displacement is placed in front of the pickup coil 22 at a mean distance of 20 mils and caused to vibrate with a peak-to-peak displacement of 1 mil. The potentiometer 64 is then adjusted such that the output sinusoidal vibration signal has an amplitude of 750 millivolts RMS. From these parameters, the vibrational displacement of any rotating body can be determined independent of temperature variations due to the temperature compensating feature described above.

FIG. 5 shows the variation in bias voltage on the base of transistor 32 with temperature in order to maintain an output direct current voltage of six volts at terminal 84. At a temperature of about 85° F., the positive bias voltage on the base of the PNP transistor 32 is about fourteen volts. However, as the temperature increases to 250° F., the bias voltage decreases to less than 12.8 volts, thereby compensating for what would otherwise be a natural increase in the amplitude of the output oscillations.

As the temperature increases, the aluminum tube 28 which carries coil 22 elongates as a result of thermal expansion. This has the effect of moving the coil closer to the rotating object, such as a shaft within bearing 12, and acts also to decrease the amplitude of the output oscillations in response to an increase in temperature. At a temperature of 85° F., for example, the growth over normal room temperature is only 0.4 mil. This increases progressively to 4.5 mils at 250° F.

In FIG. 6, another embodiment of the invention is shown wherein the sensing circuitry itself is identical to that shown in FIG. 3, but wherein alternating current temperature compensation is employed rather than direct current compensation. Accordingly, elements in the sensing circuitry itself which correspond to those shown in FIG. 3 are identified by like reference numerals.

In the case of FIG. 6, a source 110 of alternating current potential, preferably having a frequency of 60 cycles per second, is applied through resistor 112 and radio frequency choke 114 to point 88. Low frequency oscillations from the 60-cycle per second source 110 are prevented from entering the oscillator by means of a high-pass filter 116 which will attenuate the low frequency signal but not the high frequency 1 megacycle signal produced by the oscillator itself.

The alternating current voltage at point 88, the amplitude of which, is dependent upon the resistivity of the coil 22, is applied through a radio frequency choke 118 to the input of an alternating current operational amplifier 120 having a negative feedback path including rheostat 122. The output of the alternating current amplifier, comprising a 60-cycle per second signal, is applied via a coupling capacitor 124 across a resistor 126. The voltage across resistor 126, in turn, is applied to a detector comprising diode 128 and capacitor 130. The resulting direct current voltage, which is now proportional to the resistivity and, hence, to the temperature of the pickup coil 22, is applied as a positive voltage to the base of an NPN transistor 132. Consequently, as the temperature and resistivity of the coil 22 increase, the bias on the base of transistor 132 decreases. The resulting decrease in positive voltage, appearing across resistor 134 is applied through resistor 136 to the base of transistor 32 and the oscillator 30. Since transistor 32 is a PNP transistor, and since the potential across resistor 134 has decreased, the gain of PNP transistor 32 is decreased to compensate for the increase in temperature and resistivity of the coil 22.

It will be apparent that instead of applying a bias voltage to the base of a transistor in the oscillator itself, it could be applied with equal effectiveness to the control element of an electron valve in a succeeding stage.

I claim as my invention:

1. In electrical sensing apparatus, the combination of an electrical oscillator including a tuned circuit having inductive and capacitive elements therein, the amplitude of the oscillations produced by said oscillator being a function of the spacing between said inductive element and a metallic object in the field of said inductive element, means for applying a potential across said inductive element separate and apart from that due to oscillations produced by said oscillator whereby the magnitude of said potential will be a function of the temperature of said inductive element, means responsive to said potential across the inductive element for varying the amplitude of said oscillations as a function of the magnitude of said potential, and filter means for electrically isolating said last-named means from oscillations produced by said oscillator.

2. The combination of claim 1 wherein said circuit is connected to an electron valve having a control element, means for amplifying the potential across said inductive element, and means for applying said amplified potential to said control element to decrease the gain of the electron valve as the temperature of the inductive element increases and increase the gain of the electron valve as the temperature of the inductive element decreases.

3. The combination of claim 2 wherein the potential applied across said inductive element is a direct current potential and said means for amplifying the potential comprises an operational amplifier.

4. The combination of claim 1 wherein the potential applied across said inductive element is an alternating current potential having a frequency lower than that of the oscillations produced by said oscillator, and including filtering apparatus for isolating said alternating current potential from said oscillator.

5. The combination of claim 4 wherein said amplifier is an alternating current amplifier, the combination including detector circuitry for converting the output of said alternating current amplifier to a direct current potential, and means for utilizing said direct current potential to vary the amplitude of the oscillations produced by said oscillator.

6. The combination of claim 1 wherein said oscillator includes an electron valve comprising a transistor having an emitter, a collector and a base, a tank circuit for said oscillator including said first-mentioned inductive element and a second inductive element connected in parallel with the first-mentioned inductive element, and means for applying a potential proportional to said separate potential applied across said inductive element to the base of said transistor.

7. The combination of claim 6 including means for rectifying the output of said oscillator.

8. The combination of claim 7 including means for amplfying alternating current components of the direct current output of said rectifying means.

References Cited

UNITED STATES PATENTS

| | | | |
|---|---|---|---|
| 3,117,311 | 1/1964 | Lemaire. | |
| 3,329,906 | 7/1967 | Bringert | 324—41 X |
| 3,397,364 | 8/1968 | Crandall | 324—41 X |

ALFRED E. SMITH, Primary Examiner

U.S. Cl. X.R.

331—65, 109, 182